Patented June 20, 1944

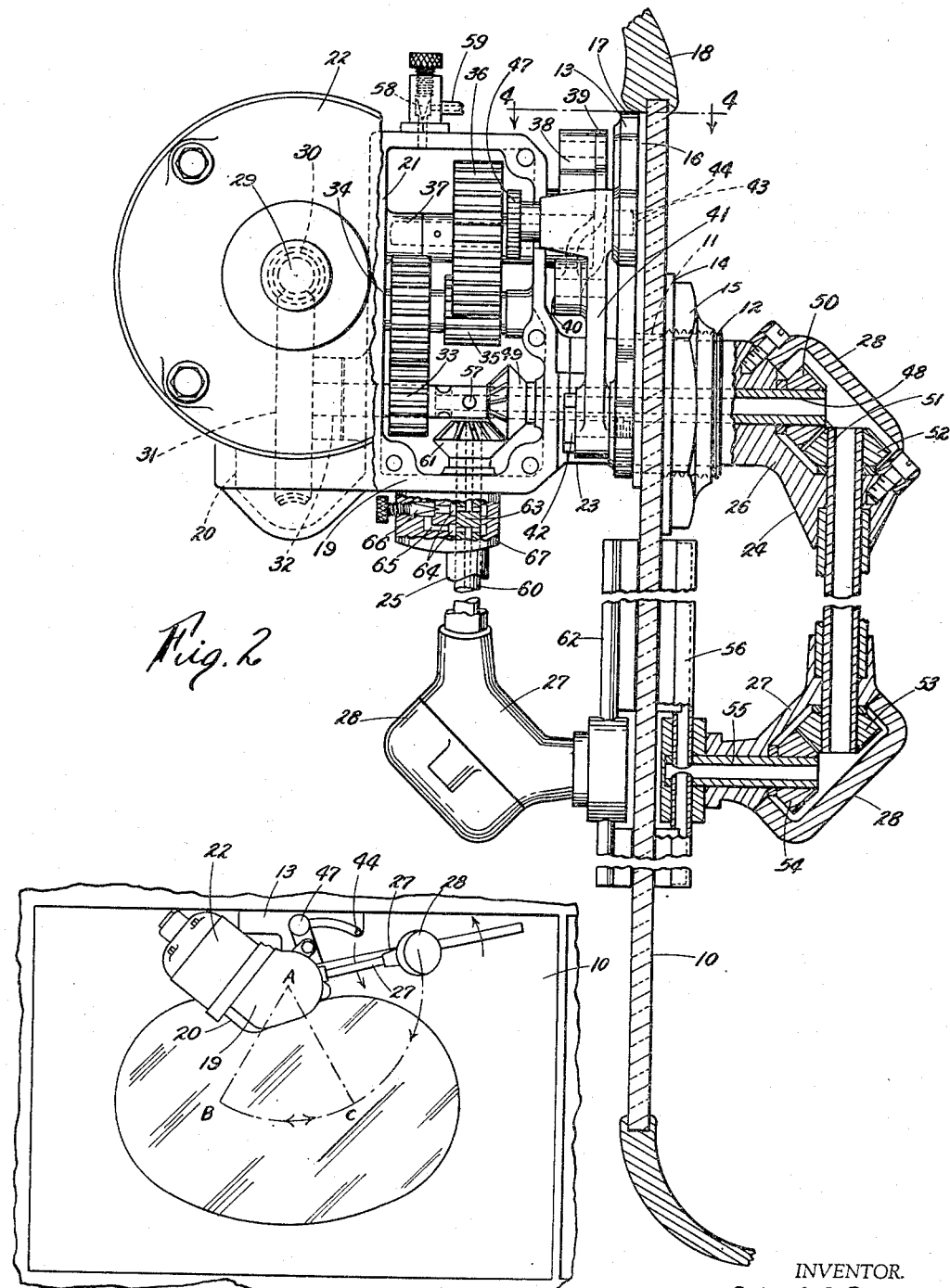

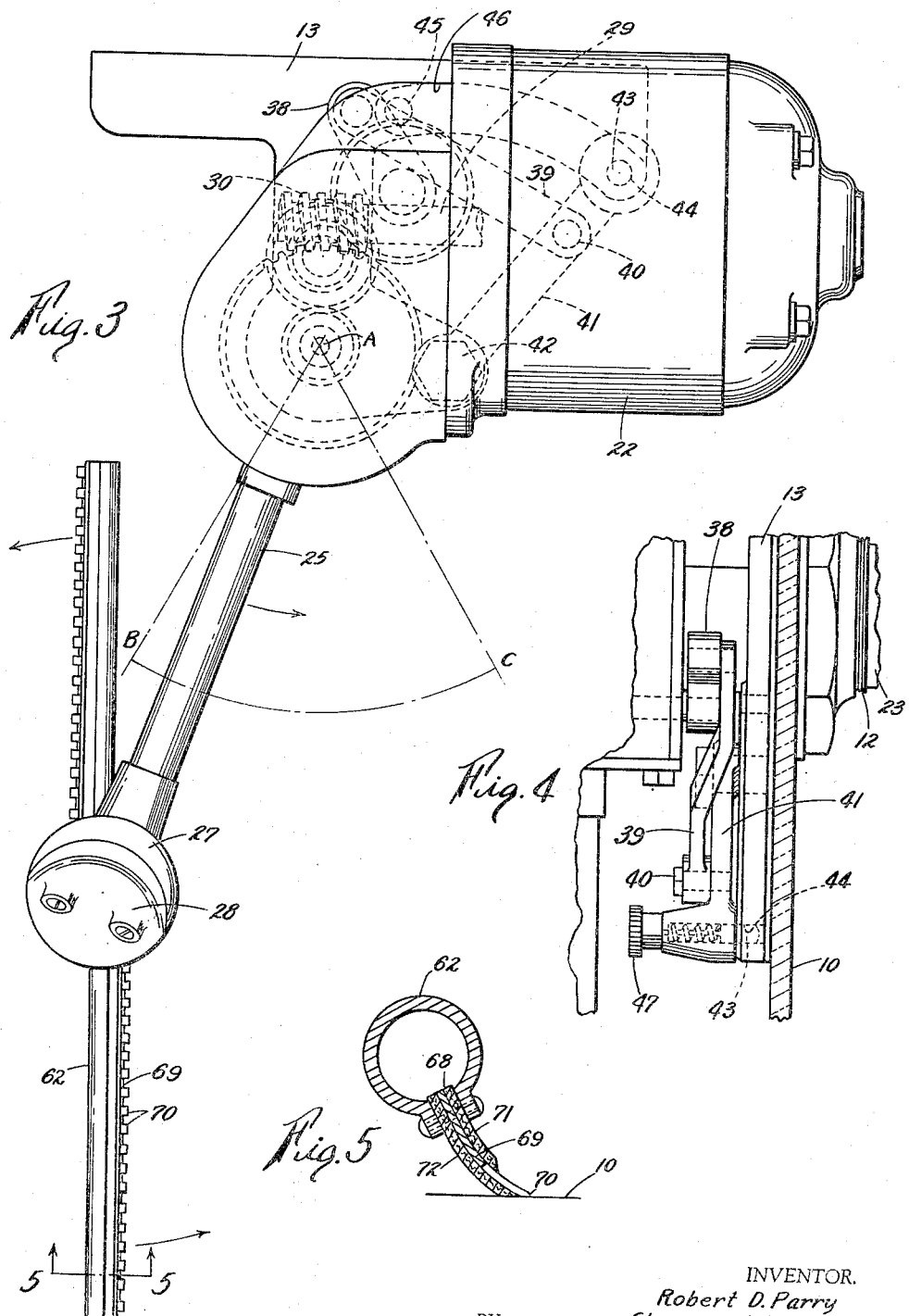

2,351,699

UNITED STATES PATENT OFFICE 2,351,699

AIRCRAFT WINDSHIELD SCRAPER

Robert D. Parry, Cincinnati, and Clarence F. Hartman, Silverton, Ohio, assignors of one-third to Wiley W. Osborne, Cincinnati, Ohio Application June 29, 1942, Serial No. 448,956

7 Claims. (Cl. 15—250)

The present invention relates to ice scrapers for windows or windshields of aircraft, and has for an object the provision of a compact and efficient means for maintaining a clear vision area on the windshield under conditions which ordinarily cause ice to form on both the outside and inside surfaces of the windshield and make it impossible to see through it.

Another object of the invention is to provide a device whereby ice on the surfaces of the windshield is removed by the combined action of ice scraping and the application of antifreeze solution.

Still another object of the invention is to provide in an ice scraper of the class described a rotary scraper blade arranged to distribute antifreeze solution over the surface of the windshield and over at least parts of the blade to keep the windshield area clear and the scraper blade in a condition of greatest efficiency.

A further object of the invention is to provide a rotary scraper blade for a device of this kind with a serrated edge in order to effect a very complete removal of ice as rapidly as it forms on the area of the windshield upon which said scraper operates.

A still further object of the invention is to provide a device of this kind wherein the moving parts which are subjected to intense cold are cause to operate in a bath of antifreeze solution which serves as a lubricant for such parts as well as a supply of antifreeze for use on the windshield and the scraper blade.

These and other objects are attained by the means and method herein described and disclosed in the accompanying drawings, in which:

Fig. 1 is a front elevational view of a device of the invention mounted at the top of an aircraft windshield or window, viewed from the inside of the craft and showing the device in inoperative position, the windshield having the cleared area shown thereon and the limits of oscillation of the scraper arms indicated in dashed lines.

Fig. 2 is a side elevational view of the device in an operative position on the windshield, parts being broken away, the cover plate being removed from the gear chamber, and the exterior scraper arm being shown in cross section along its longitudinal center.

Fig. 3 is a front elevational view of the device showing the scraper blade in detail and also showing in dotted lines the motor drive mechanism and the oscillation control linkage.

Fig. 4 is a view taken on line 4—4 of Fig. 2.

Fig. 5 is a view taken on line 5—5 of Fig. 3.

Devices intended for the maintenance of a clear vision area on the windows or shields of aircraft as heretofore known have been found wanting in one or more particulars, especially when the craft is flown at high altitude where such craft are required to be flown blind because the windows and shields are soon completely coated with ice on both inside and outside surfaces. The devices heretofore known have in some instances been ineffective if operated after the ice has formed; in other instances the ice removed from the shield accumulates rapidly on the scraper which becomes ineffective and eventually freezes rigidly to the ice covered shield.

All these difficulties are obviated by the hereinafter described device which shows one embodiment of our invention.

The ice scraping mechanism of the invention consists generally of a sturdy motor and gear casing with a pair of parallel scraper arms rigidly mounted thereon, the entire structure being journaled for rocking or oscillatory movement in a journal bearing which passes through and is fixed to the windshield to be cleared. The free ends of the scraper arms carry rotary ice scraper blades which operate in unison on both the inside and outside surfaces of the windshield. A crank and linkage mechanism is provided for forming an operating connection between a moving part of the structure and a fixed mounting plate, which in this instance forms a part of the windshield journal bearing. Referring now to Figs. 1 and 2, the windshield 10 has a bore 11 therethrough, and through it is passed a tubular bearing member 12 which is fixed on a mounting plate 13. The end of the tubular extension 12 is threaded and a washer 14 and nut 15 are applied thereto on the outer face of the windshield for drawing the mounting plate 13 snugly toward the inside face of the windshield against an interposed cushion gasket 16. As can be noted particularly in Figs. 1 and 2, the top of mounting plate 13 is arranged with a straight edge adapted to substantially seat against the shoulder 17 of the windshield framing member 18. Rockably mounted on the end of the tubular member 12 is a hollow gear box 19 and a reduction gear casing 20 which may be integral therewith, and which is separated from the interior of box 19 by a wall 21. Electric motor 22 is secured in relatively offset relation to box 19 and casing 20, so that the assembled structure forms a unit. It will be noted in Fig. 2 that motor 22 is shown as broken away in order to more clearly disclose the interior of gear box 19. Integral with gear box 19 is a tubular extension 23 which is journaled in the bearing 12, the center of said extension 23 and bearing 12 being the center of oscillation for the device. Rigidly attached to the end of extension 23, exteriorly of the windshield, is a scraper arm structure 24, while parallel therewith and rigidly fixed to the gear box 19 is a scraper arm structure 25. The arm structures 24 and 25 include hollow enlargements 26 and 27 closable by cover caps 28.

The power and drive mechanism of the device will now be explained. The motor 22 has an extended shaft 29 the end of which has a worm 30 disposed in casing 20. Worm 30 meshes with worm wheel 31 which drives a stud shaft 32 which is journaled for rotation in the wall 21 which separates box 19 and casing 20. A pinion 33 fixed to shaft 32 turns gears 34 which is mounted for rotation with gear 35, the gear 35 in turn meshing with crank-operating gear 36, which is secured to shaft 37 that extends exteriorly through gear box 19 and has fixed thereon a crank 38, (see Figs. 1 and 4). A bent link 39 is pivoted at its one end to the free end of the rotary crank 38 while the opposite end of said link is pivoted at 40 intermediate the ends of a lever 41. The lever 41 has a fixed pivotal mounting at 42 on an extended portion of plate 13. At the opposite end of lever 41 is a spring pressed pin 43 which is adapted to be selectively entered into holes 44 and 45 which are disposed adjacent the opposite ends of an arcuate shoulder portion 46 on plate 13.

By reference to Fig. 3, it will be seen that when the motor shaft turns, the external rotary crank 38 will be turned at a predetermined rate of speed, and that with the lever 41 held in the position shown in Fig. 3 by pin 43 seated in hole 44, the crank 38 operating against the end of bent link 39 will cause the entire motor and associated carrying and scraper arms to oscillate about the longitudinal axis of extension 23 and shaft 32, while the plate 13 and lever 41 remain in fixed relation with the windshield. The line of the axis of shaft 32 and extension 23 defines the center of oscillation for the device, and this center is indicated at A in Figs. 1 and 3. The limits of oscillatory movement of arms 24 and 25 are indicated in said figures by lines A—B and A—C. The spring urged pin 43 which holds lever 41 in position during operation of the device may be retracted by pulling outwardly on the finger knob 47 of said pin, whereupon the pin may be moved to and inserted in the hole 45 in plate 13, thus causing the entire device to turn further about its center of rotation A to assume an inoperative position as illustrated in Fig. 1. In so shifting the lever 41, the pivotal point 40 of bent link 39 is shifted over to substantially a dead center position. The device is de-energized when in this position, and it remains entirely free of the clear vision area upon which the device operates to free the window or shield of ice.

The ice scraping function and the selective application of antifreeze solution is effected by the following described mechanism. Axially aligned, and comprising an extension of the shaft 32, is a hollow tube shaft 48 which is journaled in gear box 19 and extension 23, and extends into the hollow enlargement 26 at the top of arm 24. Interiorly of gear box 19 there is a bevel pinion 49 secured on tube shaft 48. In the hollow enlargement 26 a bevel pinion 50 is secured at the free end of the tube shaft or extension 48. Extending axially through the hollow center of scraper arm 24 is a tube shaft 51 having a bevel pinion 52 fixed thereto and meshing with bevel pinion 50. At the opposite end of tube shaft 51 there is secured a bevel pinion 53 located in the hollow enlargement 27 at the end of arm 24, and this in turn meshes with bevel pinion 54 fixed on a tube shaft 55 which is journaled in the enlargement 27 and has secured to its extended end a tubular scraper blade holder 56. The hollow extension or tube shaft 48 has an opening 57 affording communication with the interior of gear box 19. It should now be noted that gear box 19 is normally filled with antifreeze solution which serves as a lubricant for the gear trains in the said gear box as well as for the moving parts in the scraper arms. Gear box 19 has a suitable valve 58 to control the flow of antifreeze and lubricant solution into the gear box by way of a supply tube or hose 59 that connects with a supply reservoir (not shown). It will be noted that the rate of flow of antifreeze solution through scraper arm 24 and into the hollow scraper blade holder 56 may be regulated by valve 58. The scraper arm 25 has a hollow tube shaft 60 extending through the center thereof and at the upper end of said shaft is a bevel pinion 61 meshing with bevel pinion 49. The internal structure at the enlarged lower end of scraper arm 25 is in all essential respects similar to that illustrated in the cross-sectional showing of the externally disposed scraper arm 24, and a description thereof need not be repeated. However, it should be noted that tube shaft 60 is so arranged as to afford control of the flow of antifreeze solution to the interiorly disposed scraper blade holder 62. This may be accomplished in any suitable fashion, for example, by providing a blocked section 63 in the tube shaft and providing annular grooves 64 and a by-pass 65 under the control of a needle valve 66 at a suitable location, for example, in the enlargement 67 where scraper arm 25 connects with gear box 19. The operator of the aircraft is enabled, by the means just described, to apply antifreeze solution to the interior face of window or shield 10 in order to remove the ice from that surface so long as required, and he may find it advantageous to dispense with the application of antifreeze solution interiorly of the window while outside conditions may require the continued use of the solution. The construction of the windshield scrapers and holders therefore is essentially alike for both the inside and outside members.

Reference is now made to Fig. 5 which shows in cross-section the hollow windshield scraper blade holder with the ice scraper mounted therein. The holder comprises a longitudinally split tube 62, in the slot 68 of which is a metallic scraper blade 69 which is desirably provided on the leading edge with serrations or scraper teeth 70. The blade 69 is interposed between an upper strip 71 and a lower strip 72 both of porous material so that the antifreeze solution may bleed or seep out of the hollow interior of the holder and be applied directly to the glass by the edge of the strip 72. At the same time the strip 71 provides a limited distribution of the antifreeze solution on the top of the scraper blade so that the solution may run down to the points of the teeth and thus materially assist in quickly and thoroughly removing any adherent ice from the window or shield, and also prevent the accumulation and freezing of the liberated ice on the scraper blades. The slotting or serration of the blades 69 provides an even tension of the blade on the windshield. This arrangement also provides a saw tooth type of scraping action on the frozen surface which cuts through and scrapes off the ice and frost with less power expenditure and a lesser starting torque when the device is initially placed in action. Regardless of the shape of the scraping edge of the scraper blade however, the bleeding or seepage of antifreeze solution onto the blade prevents accumulated ice from raising the scraping edge from the glass and also avoids the possibility of the blade becoming frozen to the glass.

The housing 20 will be understood to be out of fluid communication with the gear box 19 so that the worm 30, and worm wheel 31 may be lubricated with a conventional lubricant suited for such parts.

The entire device is of sturdy construction and the motor 22 will be selected to utilize the electrical or hydraulic power also available in the aircraft upon which the device is installed. The device will be constructed heavy enough and with sufficient power to effectively perform its stated functions despite heavy wind pressures on the outside of the window or shield 10.

In use the device is placed in operation only when flying in low temperature zones, in snow or sleet, or in high altitude flight where the accumulation of ice is almost universally encountered. When the operator encounters atmospheric conditions where ice forms on the outside or both outside and inside of the window or shield 10, the device is placed in operation by grasping knob 47 and removing it from the position shown in Fig. 1 and inserting it in hole 44, whereupon the device assumes the position shown in Fig. 3. The scraper arms and the associated gear box, gear casing and motor then continue to oscillate within the limits indicated, while the ice scraper blades and holders are continuously rotating and describing traveling circular areas on the faces of the windshield. The total area cleared will represent a figure which is a composite of the circular area shifting arcuately back and forth across the faces of the window. This area is without any fixed blindspot. The arms are substantially superposed from the point of vision of the pilot and they oscillate in unison at a rate of speed that is not detrimental to steady vision through the windshield. The aforementioned cleared area will have no uncleaned places therein because the center of rotation of the scraper blades shifts arcuately and the blades are constantly scraping across the arcuate path described by said center of rotation.

What is claimed is:

1. A windshield ice scraper mechanism comprising an encased power transmission unit, an arm and a bearing member rigid with said unit and having their axes disposed at right angles in a common plane, said bearing member arranged to extend through a windshield whereby said arm and said unit are disposed on opposite sides of such windshield, a scraper blade on the free end of the arm, a power crank rotatably mounted on the unit and having its axis of rotation parallel with the axis of said bearing member and a link member adapted for fixation at one end and having its opposite end pivoted to said crank whereby the said unit and said arm are oscillated about the axis of said bearing member.

2. A windshield scraper mechanism comprising an encased power and transmission unit, a bearing shaft rigid therewith, adapted for journaled mounting on a windshield and serving as an axis of oscillation for said unit, a rigid arm on the unit oscillatable therewith in parallelism with a windshield, a rotary power crank on said unit, a link pivoted at one end to said crank, a lever having said link pivoted thereto intermediate the ends of the lever, means providing a fixed pivot for one end of said lever, and means for adjustably fixing the other end of said lever in adjusted positions with respect to the axes of the crank and the bearing shaft for controlling power oscillation of said unit and its arm about the bearing shaft.

3. A windshield scraper comprising a bearing shaft, means to journal said bearing shaft for oscillatory movement, a gear box, a pair of parallel arms rigidly fixed respectively on the gear box and the end of the bearing shaft, a power driven shaft extending through the gear box and the bearing shaft into the end of the arm on said shaft, scraper blades mounted for rotation in parallelism on the free ends of the respective arms, and power transmission means driven by the power shaft, extending through said arms and connected with the respective scraper blades.

4. A windshield scraper comprising a bearing shaft, means to journal said bearing shaft for oscillatory movement, a fluid-tight gear box, a pair of parallel arms rigidly fixed respectively on the gear box and the end of the bearing shaft, a power driven shaft extending through the gear box and the bearing shaft into the end of the arm on said shaft, scraper blades mounted for rotation in parallelism on the free ends of the respective arms, and power transmission means driven by the power shaft, extending through said arms and connected with the respective scraper blades, the gear box provided with a supply valve whereby it is constantly filled with antifreeze solution, the power transmission means and the scraper blades having passages thereto whereby the antifreeze solution is distributed on the rotary blades.

5. A windshield scraper comprising an encased power and transmission unit including a rigidly projecting hollow bearing shaft, means to journal said shaft on a windshield, a rotary power crank extending from said unit, a link connected to the free end of the power crank, means to fix the free end of the link with respect to the axis of the bearing shaft, rigid arms on said unit extending in parallelism radially of the axis of the bearing shaft of said unit, said arms being hollow, tubular shafting extending through the bearing shaft and said arms, tubular shafts mounted in the free ends of the arms and in axial alignment with each other, hollow scraper blades on adjacent ends of said last mentioned tubular shafts, bevel pinions connecting the several tubular shafts whereby the scraper blades may be rotated in unison, the unit comprising a fluid-tight compartment having communication through the tubular shafting with the interior of the rigid arms and the interior of the scraper blades thereon, valve means for controlling a flow of fluid to said compartment from a source of supply, and valve means for controlling fluid communication between said compartment and one of said arms.

6. A windshield scraper comprising a hollow body having a slot therein, a pair of porous strips and an interposed metallic blade mounted in said slot, said blade having a serrated edge, one of the porous strips being substantially coextensive with the width of the blade, the other of said porous strips terminating inwardly of the points of the serrations on said blade.

7. In a windshield scraper the combination of a pair of parallel arms, means to mount said arms for unitary oscillation on opposite sides of and in parallelism with a windshield, rotary scraper blades on the free ends of the arms for operation on opposite faces of a windshield and means providing a selectively controlled flow of antifreeze solution through said arms and onto opposite faces of the scraper blades.

ROBERT D. PARRY.
CLARENCE F. HARTMAN.